March 24, 1964     CARL-ANKER MEJYR     3,126,000
STOVE FOR BURNING GASEOUS FUEL
Filed Sept. 10, 1962
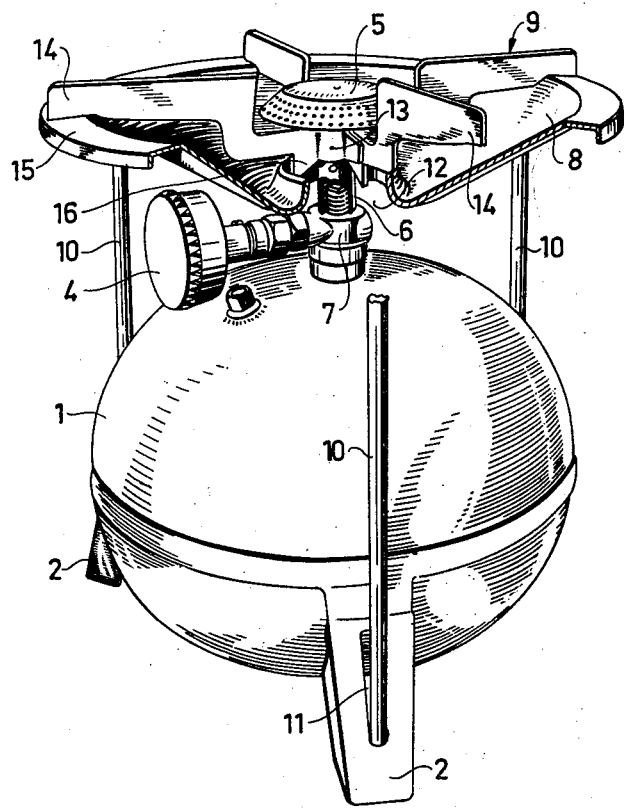
INVENTOR
Carl-Anker Mejyr
BY Harry Cole
ATTORNEY United States Patent Office 3,126,000
Patented Mar. 24, 1964

3,126,000
STOVE FOR BURNING GASEOUS FUEL
Carl-Anker Mejyr, Flen, Sweden, assignor to Aktiebolaget Bahco, Stockholm, Sweden, a corporation of Sweden
Filed Sept. 10, 1962, Ser. No. 222,578
2 Claims. (Cl. 126—95)

The present invention relates to a stove for burning gaseous fuel of the type in which the burner is attached to the fuel container provided with a vessel support fixed to the container, said support being combined with a boil-over bowl.

Known stoves of the abovementioned type have several disadvantages, e.g. there is no simple and reliable connection between the container and the vessel support and the boil-over bowl, i.e. a connection, which guarantees an exact centering of these parts relatively to the burner and does not make it difficult to clean the boil-over bowl. This centering especially of the boil-over bowl is of very great importance as otherwise the air supply to the burner will be unevenly distributed.

The object of the present invention is to remove the above mentioned disadvantages and to that end the invention is substantially characterized in that the vessel support and the boil-over bowl consist of two separate elements connected to each other and to the container by means of the burner head, and in that the vessel support is provided with centering means which automatically center the bowl and the support relatively to each other as well as relatively to the burner when the burner head is fixed.

The accompanying drawings depict a practical arrangement of the stove according to the present invention which drawing is in perspective and partly in section of the stove.

Referring now to the drawing, 1 designates a gas container or tank in the shape of a ball which is provided with three feet 2 and at the upper part with a burner which is controlled in a known way by means of a control knob 4. The burner head 5 is connected to the valve housing 7 by means of an internally threaded conduit or stem 6. For supporting the vessel there are provided a vessel support 9 combined with a boil-over bowl 8 which elements surround the burner concentrically. The boil-over bowl 8 which is provided with three legs 10 the lower ends of which project into recesses 11 in the feet 2 of the container 1, is provided with a circular opening 12 for allowing the burner to pass through the bowl, the circumferential edge of said opening being bent upwardly as shown in the drawing. The vessel support proper 9 consists of four arms 14 which project radially from a centrally arranged sleeve 13 and the outer parts of which are intended to rest on the outer peripheral edge portion 15 of the boil-over bowl 8, while those parts of the arms which lie close to the sleeve 13 are provided with downwardly directed projections 16 which are intended to project into the central opening 12 of the bowl 8. In assembling the device, the burner head 5 is first removed from the valve housing 7 and then the boil-over bowl 8 is put on place and thereafter the vessel support is placed on to the bowl in such a way that the projections 16 project into the opening 12. Thereupon, the conduit 6 of the burner head 5 is inserted through the sleeve 13 of the vessel support and screwed onto the valve housing 7 whereby the elements 8 and 9 automatically will be centered exactly relatively to the burner. The sleeve 13 and the projections 16 are so dimensioned that after the burner head is completely fixed the vessel support is not clamped between the bowl and the burner head but is free to be turned around the conduit 6 thereby facilitating cleaning of the bowl. From the above mentioned it is clear that the boil-over bowl 8 and the vessel support 9 are fixed only by means of the burner head and thus assembling and disassembling of the stove are very simple, and also the intended centering of elements 8 and 9 is obtained automatically. By forming the opening 12 of the bowl 8 in the way mentioned it is further achieved that during the operation of the burner an air of stream serving as secondary air is drawn through the opening which simultaneously causes a cooling action of the bowl and thus prevents a too great heating of that part of the container facing the burner.

The claims defining the invention are as follows.

1. A gaseous fuel burning stove, comprising a tank for said fuel, a burner head having a fuel-supply stem connected to said tank, a horizontally positioned vessel support having a central sleeve through which said fuel-supply stem extends and which acts as centering means for said vessel support, a boil-over bowl positioned horizontally below and supporting said vessel support and having a central opening co-axial with said fuel supply stem, means for supporting said boil-over bowl in said position, and means on said vessel support which project downwardly into said central opening and act to center said boil-over bowl in relation to said burner head and vessel support.

2. A gaseous fuel burning stove, comprising a tank for said fuel, a burner head having a fuel-supply stem connected to said tank, a horizontally positioned vessel support having a central sleeve through which said fuel-supply stem extends and which acts as centering means for said vessel support, a boil-over bowl positioned horizontally below and supporting said vessel support and having a central opening co-axial with said fuel supply stem, means for supporting said boil-over bowl in said position, said boil-over bowl having an upwardly extending central part having a circumferential edge defining said opening, and means on said vessel support which project downwardly into said central opening and engage said edge of said upwardly extending part of said boil-over bowl and act to center said boil-over bowl in relation to said burner head and said vessel support.

References Cited in the file of this patent
UNITED STATES PATENTS
2,257,395    Parker _____ Sept. 30, 1941
2,825,325    Ross _____ Mar. 4, 1958
FOREIGN PATENTS
479,524    Germany _____ July 18, 1929